(12) United States Patent
Ackloo

(10) Patent No.: US 7,967,189 B2
(45) Date of Patent: Jun. 28, 2011

(54) COMPUTER KEYBOARD OVERLAY

(76) Inventor: Andrew Ackloo, Toronto (CA)

( * ) Notice: Subject to any disclaimer, the term of this patent is extended or adjusted under 35 U.S.C. 154(b) by 506 days.

(21) Appl. No.: 11/878,631

(22) Filed: Jul. 25, 2007

(65) Prior Publication Data
US 2009/0029329 A1 Jan. 29, 2009

(51) Int. Cl.
*B06D 25/00* (2006.01)
(52) U.S. Cl. ............. 235/145 R; 715/765; 345/172
(58) Field of Classification Search ........... 235/145 R; 715/765, 810, 773, 769; 345/172, 173; 341/23
See application file for complete search history.

(56) References Cited

U.S. PATENT DOCUMENTS

| | | | | |
|---|---|---|---|---|
| 3,317,019 A | * | 5/1967 | Braune | 400/490 |
| 5,253,940 A | * | 10/1993 | Abecassis | 400/495 |
| 6,050,825 A | | 4/2000 | Nichol et al. | |
| 2002/0051957 A1 | | 5/2002 | Schwarzkopf | |
| 2006/0061542 A1 | | 3/2006 | Stokic | |

\* cited by examiner

*Primary Examiner* — Karl D. Frech
(74) *Attorney, Agent, or Firm* — Perry + Currier Inc.; David J. Johnson; Stephen J. Perry

(57) ABSTRACT

In one embodiment, the invention provides a keyboard overlay adapted to indicate which one of a plurality of menu commands provided by a particular software application is invoked when an alphanumeric key is pressed together with a modifier key on a computer keyboard. In this embodiment, the keyboard overlay has a portion overlaying the modifier key and displaying a predetermined color thereby associating the color with the modifier key. The keyboard overlay has a portion overlaying the alphanumeric key and displaying the predetermined color together with closely associated indicia identifying the menu command. More complex arrangements are described that indicate keyboard equivalents that involve pressing an alphanumeric key together with more than one modifier key.

14 Claims, 4 Drawing Sheets

COMPUTER KEYBOARD OVERLAY

FIELD OF THE INVENTION

The invention relates generally to computer keyboards and, more specifically, to keyboard overlays that indicate keyboard equivalents to various menu commands associated with a particular software application.

DESCRIPTION OF THE PRIOR ART

Software applications commonly provide menus to allow a user to invoke various commands and associated methods. To speed the process, many software applications permit a menu command to be invoked by using a keyboard equivalent, namely, a unique combination of keys. Use of a keyboard equivalent typically involves pressing an alphanumeric key simultaneously with one or more modifier keys, such as command, control, shift and option/alt keys. It is generally faster to invoke a menu command using a keyboard equivalent than to make a menu selection with a mouse but a newcomer to an application may be obliged to learn and remember numerous keyboard equivalents to obtain a full speed advantage. Moreover, while learning keyboard equivalents, the user is likely to refer repeatedly to a software manual, which is a time-consuming process. The invention seeks to provide a simpler way to identify and learn keyboard equivalents.

A prior art reference pertinent to the present invention is U.S. Pat. No. 6,050,825 which issued on Apr. 18, 2000 to Nichol et al. The patent discloses a keyboard overlay formed of thin flexible polyurethane and used generally to label keyboard keys. In one embodiment, the overlay places Cyrillic characters atop each key of a keyboard, and in another embodiments, the overlay labels the keys in conformity with a Dvorak key arrangement. The patent is more immediately concerned with providing a near-universal overlay, which is apparently accomplished by surrounding and labeling only alphanumeric keys.

Another pertinent prior art reference is U.S. patent application no. 2002/0051957 of Dawn Marie Schwarzkopf, published on May 2, 2002. It teaches use of a flexible film overlay that conforms to and receives the keys of a conventional keyboard. The keyboard overlay effectively labels alphabetic keys with lower case letters that a young child can apparently recognize more easily than upper case letters. The overlay is made of transparent materials so that the upper case letters normally used to label alphabetic keys are apparent as well as the corresponding lower case letters carried by the overlay, which allows a child to become familiar with both lower and upper case forms of letters.

Another pertinent prior art reference is U.S. patent application no. 2006/0061542 of Dragan Z. Stokic, published on Mar. 23, 2006, for an invention entitled "Dynamic character display input device." The published application describes a display controller for displaying characters on depressible keyboard locations or buttons. In effect, keys are labeled using active devices the permit displayed characters or information to be changed. It also teaches that the displayed characters may be changed according to, among other things, pressing of modifier keys, which would potentially facilitate learning and using keyboard equivalents. It is questioned, however, whether using active devices to label individual keys is cost-effective.

SUMMARY OF THE INVENTION

In one aspect, the invention provides a method of indicating which one of a plurality of menu commands provided by a predetermined software application is invoked when an alphanumeric key is pressed together with a modifier key on a keyboard coupled to a computer that is actively executing the software application. The method involves labeling the modifier key with predetermined indicia, thereby associating the predetermined indicia with the modifier key, and labeling the alphanumeric key with that predetermined indicia and closely associated indicia indicating the associated menu command. The closely associated indicia may comprise text or a symbol indicating the nature of the command. In preferred form, the predetermined indicia comprise a predetermined color, effectively creating an association between the color and the modifier key, and the alphanumeric keys is labeled with the same color and closely associated indicia indicating the menu command.

In a more specific aspect, the invention provides a keyboard overlay adapted to indicate which one of a plurality of menu commands provided by a predetermined software application is invoked when an alphanumeric key is pressed together with a modifier key on a computer keyboard. The overlay comprises a portion adapted to overlay the modifier key and displaying a predetermined color, thereby associating the color with the particular modifier key. The overlay comprises another portion adapted to overlay the alphanumeric key and displaying the predetermined color together with closely associated indicia indicating the menu command. In such a context, the expression "closely associated" is used to indicate a physical proximity or a presentation of the indicia that creates an association between the menu command, the alphabetic key and the modifier key (or multiple modifier keys in other embodiments). One arrangement for creating that close association is to form the portion overlaying the alphanumeric key with a background area of the color associated with the modifier key and to place text or a symbol identifying the menu command in a neutral color (that is, a color not associated with any modifier key) within that background area.

The keyboard overlay may be further adapted to indicate another menu command invoked when the alphanumeric key and the modifier key are pressed together with yet another modifier key. The keyboard overlay comprises a portion adapted to overlay the other modifier key and displaying another predetermined color thereby associating the other modifier key with the other color. In this instance, the portion of the keyboard overlay adapted to overlay the alphanumeric key displays not only the predetermined color in close association with indicia identifying the one menu command but also separately displays the predetermined color in combination with the other predetermined color and closely associated indicia identifying the other menu command. One method of establishing such a close association is to label the alphanumeric key with another background area of the first predetermined color and to form the indicia in the other predetermined color within the background area. Another method of establishing the close association is to use parallel stripes of both colors and to associate the other menu command using indicia such as text or a symbol that spans the parallel stripes and indicates the other menu command.

Various aspects of the invention will be apparent from the description below of preferred embodiments and will be more specifically defined in the appended claims.

DESCRIPTION OF THE DRAWINGS

The invention will be better understood with reference to drawings, in which.

Figure 1:
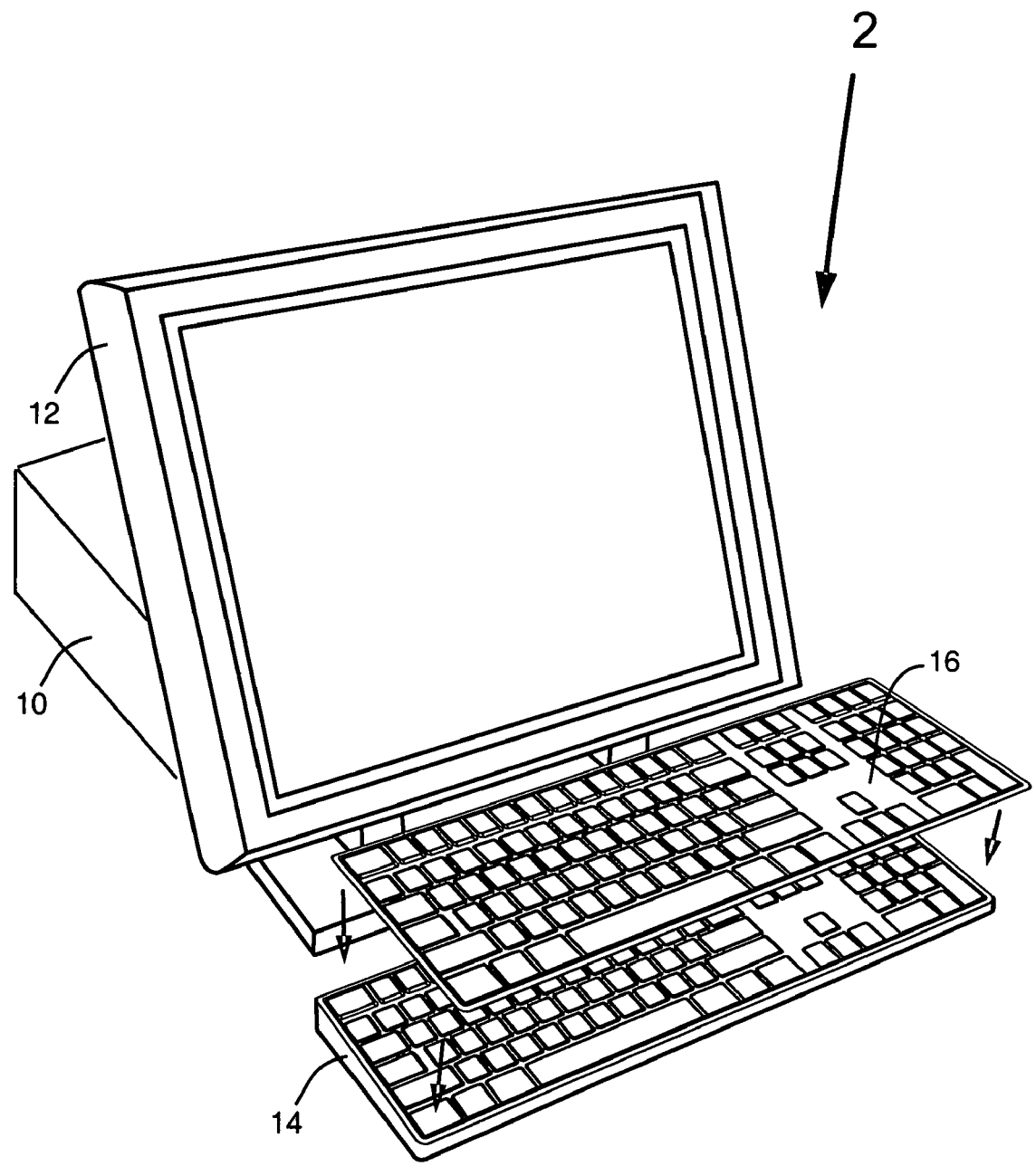
FIG. 1 is a diagrammatic representation of a computer system comprising a computer, a monitor, a keyboard and a keyboard overlay embodying the invention.
Figure 2:
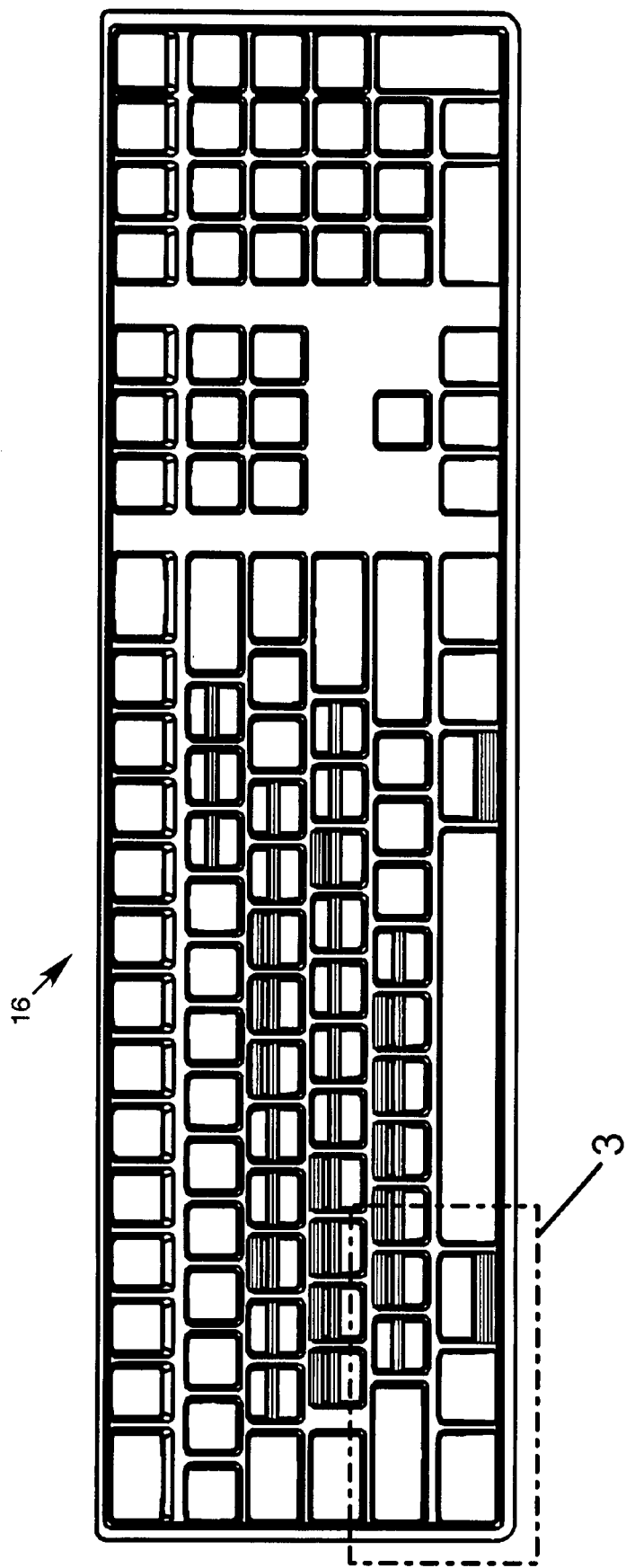
FIG. 2 is a view along the line 2 of FIG. 1 further detailing the keyboard overlay.
Figure 3:
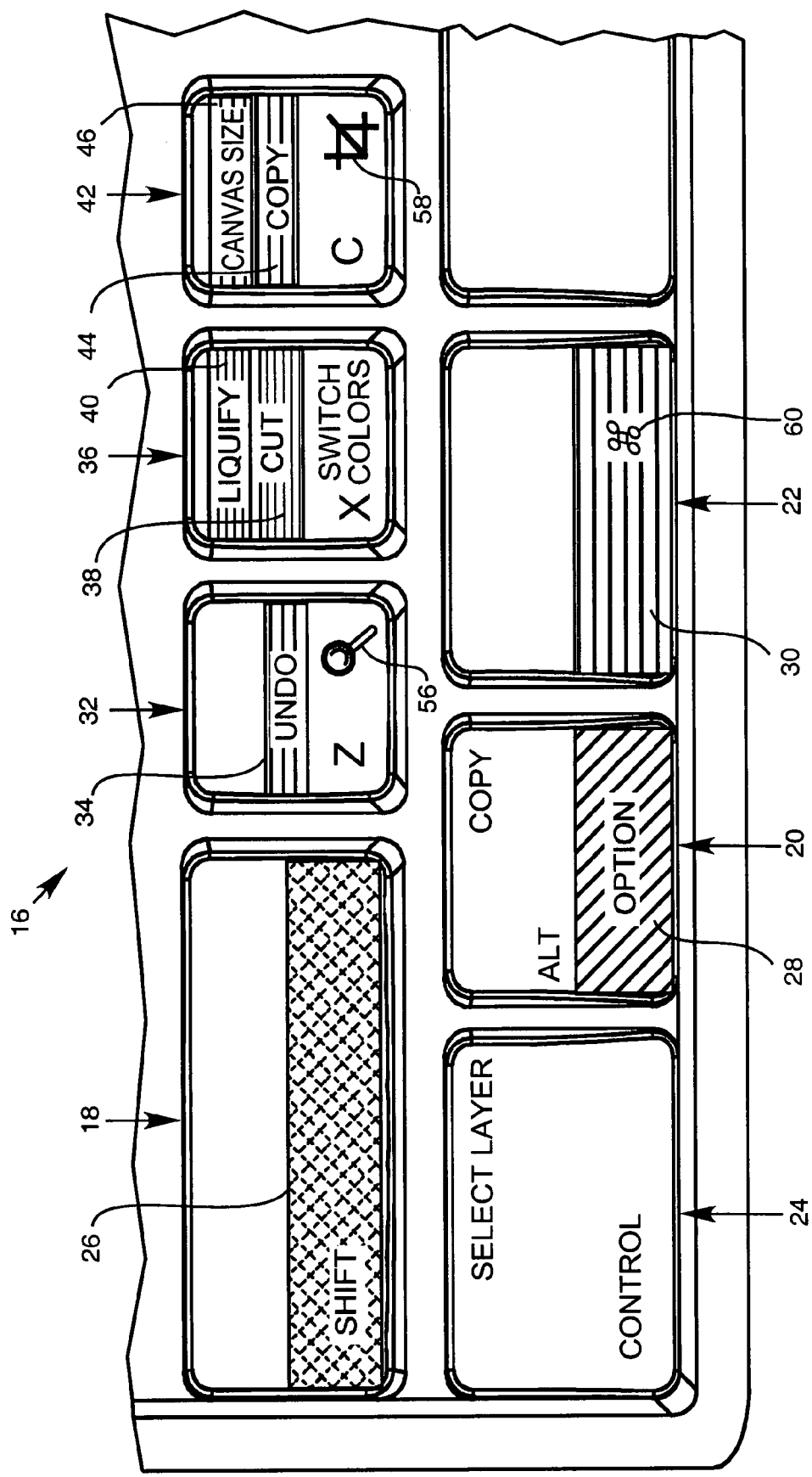
FIG. 3 is an enlarged, fragmented view of the keyboard overlay showing portions overlaying modifier keys and the Z-key, X-key and C-key; and, FIG. 4 is an enlarged, fragmented view corresponding to the view of FIG. 3 and showing an alternative way of labeling the X- and C-keys to indicate keyboard equivalents.
Figure 4:
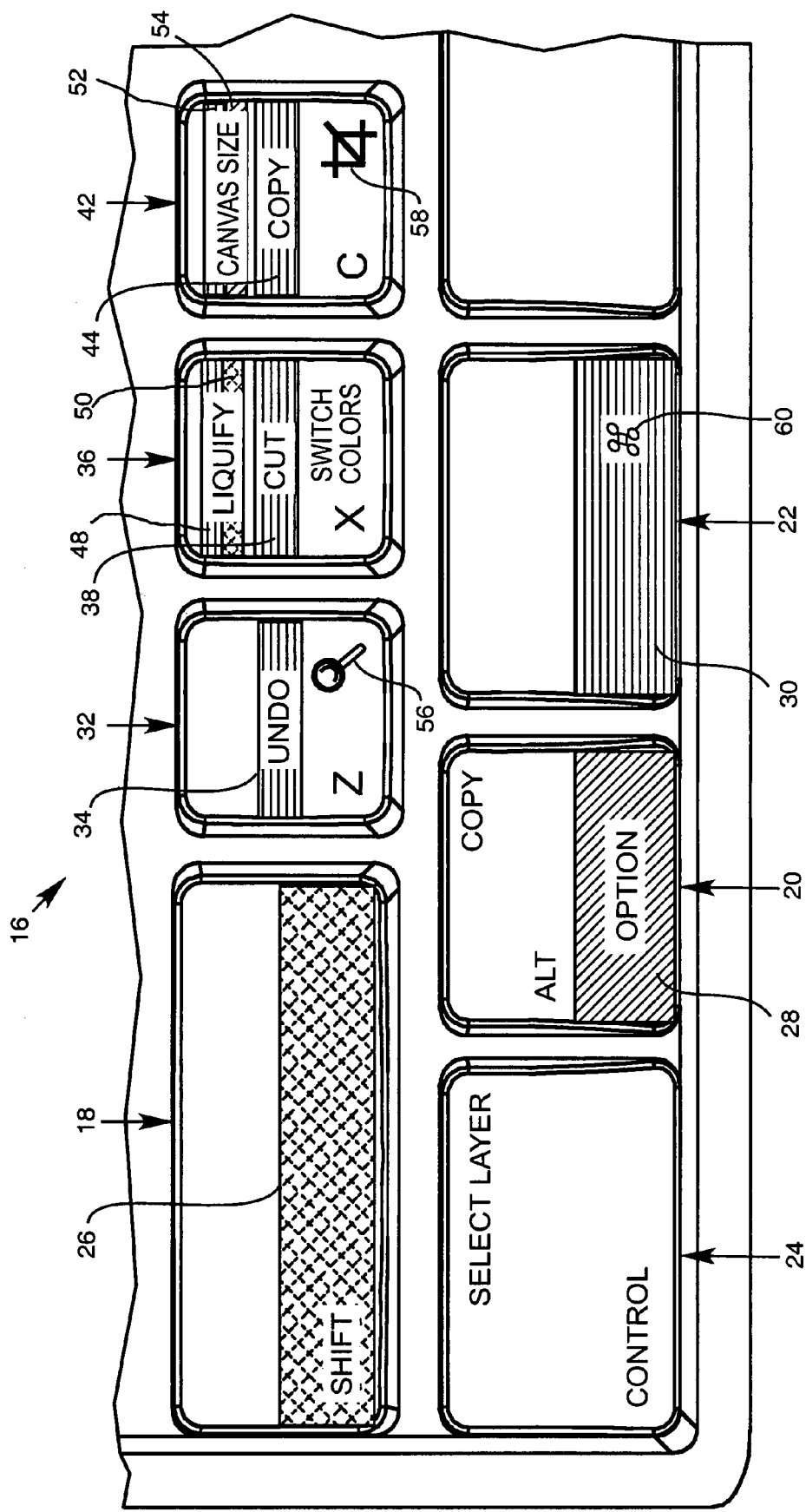

Colors associated with the overlay have not been indicated in FIGS. 1 and 2 because of issues of scale. In the views of FIGS. 3 and 4, however, cross-hatching has been used to identify particular colors applied to portions of a keyboard overlay, specifically in rectangular background areas, and such cross-hatching should not be interpreted as graphic matter. Text inscribed in a background area will typically be in a neutral color or a color associated with a particular modifier key but no attempt has been made to use cross-hatching to indicate colored text.

DESCRIPTION OF PREFERRED EMBODIMENTS

Reference is made to FIG. 1, which illustrates the context in which the present invention is used, specifically a computer system comprising a computer 10, a monitor 12 and a keyboard 14. The well-known software application Photoshop™ is assumed to be executing on the computer and to be currently active; that is, keystrokes from the keyboard 14 are directed to the Photoshop™ application for processing. A keyboard overlay 16 specifically adapted to identify the keyboard equivalents recognized by the Photoshop™ application is laid over the keyboard 14.

The keyboard overlay 16 is formed in a conventional manner as a thick, flexible, opaque silicone film. As apparent in FIGS. 1 and 2, the keyboard overlay 16 is formed with generally rectangular raised portions, which receive and overlay the keys as the overlay 16 is placed over the keyboard 14. The raised portions of the overlay 16 are labeled (not apparent in FIGS. 1 and 2), in a conventional manner, to achieve two objectives: first, to effectively relabel each key with normally associated matter such as letters, numbers, punctuation marks, symbols or, more generally, matter normally expected on the keys of a standard QWERTY keyboard; and second, to indicate which Photoshop™ menu commands are invoked when certain alphanumeric keys are pressed together with one or more modifier keys, specifically the shift key 18, the option key 20 and the command key 22.

How the keyboard overlay 16 labels the keys of the keyboard 14 to indicate keyboard equivalents will be more apparent from the enlarged, fragmented view of FIG. 3. First, the keyboard overlay 16 labels and associates each of the modifier keys 18, 20, 22 with a different color (except for the control key 24, which is not a modifier key recognized by Photoshop™). The shift key 18, for example, is labeled with an orange background 26 of generally rectangular shape in which the word "shift" is inscribed in a neutral color. (If the keyboard overlay 16 is black, which is preferred but not shown, the neutral color may be white or gray and other colors may be reserved for identification of modifier keys.) The option key 20 is labeled with a generally rectangular, green background 28 in which the word "option" is inscribed in a neutral color, and the command key 22 is labeled with a generally rectangular, blue background 30 in which the command symbol 60 is inscribed in a neutral color.

The simplest application of the invention is apparent from the labeling of the alphanumeric Z-key 32 in FIG. 3. The portion of the keyboard overlay 16 that overlays the Z-key 32 labels the Z-key 32 with a background 34 of generally rectangular shape in the same blue color associated with the command key 22. The word "UNDO" is inscribed in the blue background 34 in a neutral color. This arrangement indicates that the UNDO menu command of Photoshop™ is invoked by pressing the Z-key 32 together with the command key 22.

The portion of the keyboard overlay 16 that overlays and relabels the X-key 36 indicates that two menu commands can be invoked by pressing the X-key 36 together with appropriate modifier keys. The labeling includes, over one portion of the X-key 36, a blue background 38 of generally rectangular shape in which the word "CUT" is inscribed in a neutral color. This indicates that pressing the X-key 36 together with the command key 22 invokes the CUT menu command of Photoshop™. The labeling also indicates that the X-key 36 can be pressed simultaneously with the shift key 18 and the command key 22 to invoke a LIQUIFY menu command associated with Photoshop™. To that end, another portion of the X-key 36 is labeled with another blue background 40 to associate the command key 22, and the word LIQUIFY is inscribed within the blue background 40 in orange, thereby associating the shift key 18.

The portion of the keyboard overlay 16 overlaying the C-key 42 also indicates that two menu commands can be invoked by pressing appropriate modifier keys. The keyboard overlay 16 labels the C-key 42 with a generally rectangular, blue background 44 in which the word "COPY" is inscribed in a neutral color. This indicates that the COPY function of Photoshop™ can be invoked by pressing the C-key 42 simultaneously with the command key 22. The overlay 16 also labels the C-key 42 with another blue background 46 in which the text "CANVAS SIZE" is inscribed in the same green as used to label the option key 20. This indicates that the menu command CANVAS SIZE can be invoked by pressing the C-key 42 together with the command key 22 and the option key 20.

The same method used to label the Z-key 32, the X-key 36 and the C-key 42 to indicate keyboard equivalents would of course be applied to other alphanumeric keys associated with the keyboard 14.

An alternative method of labeling the X-key 36 to indicate keyboard equivalents for the CUT and LIQUIFY commands is apparent in FIG. 3. One portion of the X-key 36 is labeled once again with the blue background 38 in which the word "CUT" is inscribed in a neutral color, once again associating the CUT menu command with the X-key 36 and the command key 22. Another portion of the X-key 36 is, however, labeled with two parallel stripes 48, 50, one blue stripe 48 to associate the command key 22 and an orange stripe 50 to associate the shift key 18. The word "LIQUIFY" spans the two stripes to indicate that the LIQUIFY menu command is invoked by pressing the X-key 36 simultaneously with both the shift and command keys 18, 22. With respect to the C-key 42, two parallel stripes 52, 54 of blue and green, respectively, are spanned by the words "CANVAS SIZE" to indicate that the CANVAS SIZE menu command can be invoked by pressing the C-key 42 together with the command key 22 and the option key 20.

In FIGS. 3 and 4, other labels have been placed on the modifier keys and the alphabetic keys shown. More specifically, the Z-key 32 is shown with a symbolic magnifying glass 56; the X-key 36 bears the text "SWITCH COLORS"; the C-key 42 has a commonly known crop symbol 58; the control key 24 bears the text "SELECT LAYER"; and, the option key 20 is labeled with the text "COPY." These labels indicate menu commands that can be invoked by simply pressing the relevant key alone. This labeling arrangement has limited application as most software applications follow the general rule of recognizing only keyboard equivalents that involve at least one modifier key. Such labeling is advantageous with an application such as Photoshop™ and has consequently been shown, but does not embody the principles of the invention as claimed.

It will be appreciated that various embodiments of the invention have been illustrated and that modifications may be made to such embodiments without necessarily departing from the scope of the appended claims. Although the drawings have been ruled for color, it should be apparent that the patterns shown on various keys can themselves serve as indicia associated with and effectively identifying particular modifier keys, and the patterns may be used on alphanumeric keys to associate modifier keys and indicate menu commands invoked when a particular alphanumeric key is pressed simultaneously with one or more modifier keys. It will also be noted that the command key 22 is identified with a unique command key symbol 60. Comparable symbols can be applied to and associated with the various modifier keys, and such symbols, rather than distinct colors, may be applied to alphanumeric keys, once again to identify what menu commands are invoked by pressing a particular alphanumeric key together with one or more of the modifier keys. Color coding is, however, preferred for simplicity and ease in learning and remembering keyboard equivalents.

Parts List

US Keyboard Overlay
10 computer
12 monitor
14 keyboard
16 overlay
18 shift key
20 option key
22 command key
24 control key
26 orange background
28 green background
30 blue background
32 Z-key
34 background
36 X-key
38 blue background
40 blue background
42 C-key
44 blue background
46 blue background
48, 50 stripes
52, 54 stripes
56 magnifying glass symbol
58 crop symbol
60 command key symbol

I claim:

1. A keyboard overlay adapted to indicate which one of a plurality of menu commands provided by a predetermined software application is invoked when a first key is pressed together with a second key on a computer keyboard overlaid by the keyboard overlay and coupled to a computer that is actively executing the software application, the keyboard overlay comprising:
a first portion adapted to overlay the first key, the first portion comprising a first label identifying the first key, the first portion further comprising a first indicia, such that the first label and the first indicia are associated with the first key; and,
a second portion adapted to overlay the second key, the second portion comprising a second label identifying the second key, the second portion further comprising the first indicia and a second indicia indicating the menu command invoked when the first key is pressed together with the second key, such that the second label, the first indicia and the second indicia are associated with the second key.

2. The keyboard overlay of claim 1 in which the second indicia comprise at least one of text and a symbol that indicates the nature of the menu command.

3. The keyboard overlay of claim 1 in which:
the first indicia comprise a background area of a predetermined color; and,
the second indicia comprise text formed in a neutral color and located within the background area.

4. The keyboard overlay of claim 1 further adapted to indicate another of the menu commands invoked when the first key and the second key are pressed together with a third key, in which:
the keyboard overlay comprises a third portion adapted to overlay the third key, the third portion comprising a third label and a third indicia, such that the third label and the third indicia are associated with the third key; and,
wherein the second portion further comprises a combination of indicia separate from the first and second indicia the combination comprising the first indicia, the third indicia and a fourth indicia indicating the other of the menu commands.

5. The keyboard overlay of claim 4 in which:
the first indicia comprise a predetermined color;
the third indicia comprise another predetermined color;
the combination comprises parallel stripes of the predetermined color and the other predetermined color; and,
the fourth indicia comprise text in a neutral color spanning the parallel stripes.

6. The keyboard overlay of claim 4 in which:
the first indicia comprise a predetermined color;
the third indicia comprise another predetermined color;
the combination comprises a background area formed in the predetermined color; and,
the fourth indicia comprise text formed in the other predetermined color and located within the background area.

7. The keyboard overlay of claim 1, wherein the first key is a modifier key selected from the group comprising Control, Shift, Option and Command.

8. The keyboard overlay of claim 7, wherein the second key is an alphanumeric key.

9. A keyboard overlay adapted to indicate which one of a plurality of menu commands provided by a predetermined software application is invoked when a first key is pressed together with a second key on a computer keyboard overlaid by the computer overlay and coupled to a computer that is actively executing the software application, the keyboard overlay comprising:
a first portion adapted to overlay the first key, the first portion comprising a first label identifying the first key, the first portion further comprising a first color, such that the first label and the color are associated with the first key; and,
a second portion adapted to overlay the second key, the second portion comprising a second label identifying the second key, the second portion further comprising the color together with a second indicia indicating the menu command invoked when the first key is pressed together with the second key, such that the second label, the first color and the second indicia are associated with the second key.

10. The keyboard overlay of claim 9 in which the second indicia comprise at least one of text and a symbol that indicates the nature of the menu command.

11. The keyboard overlay of claim 9 in which the second portion comprises:
   a background area of the first color; and,
   the second indicia comprise text formed in a neutral color within the background area.

12. The keyboard overlay of claim 9 further adapted to indicate another of the menu commands invoked when the first key and the second key are pressed together with a third key, in which:
   the keyboard overlay comprises a third portion adapted to overlay the third key, the third portion comprising a third label and a third color, such that the third label and the other color are associated with the third key; and,
   wherein the second portion further comprises a combination of indicia separate from the first color and the second indicia, the combination comprising the first color, the third indicia and a fourth indicia indicating the other of the menu commands.

13. The keyboard overlay of claim 12 in which:
   the combination comprises parallel stripes of the first color and the third color; and,
   the fourth indicia comprise text spanning the parallel stripes.

14. The keyboard overlay of claim 12 in which:
   the combination comprises a background area formed in the first color; and,
   the fourth indicia comprise text formed in the third color and located within the background area.

* * * * *